Nov. 19, 1929.  H. H. CRAWFORD  1,736,490
MEASURING DEVICE
Filed Jan. 31, 1929  2 Sheets-Sheet 1
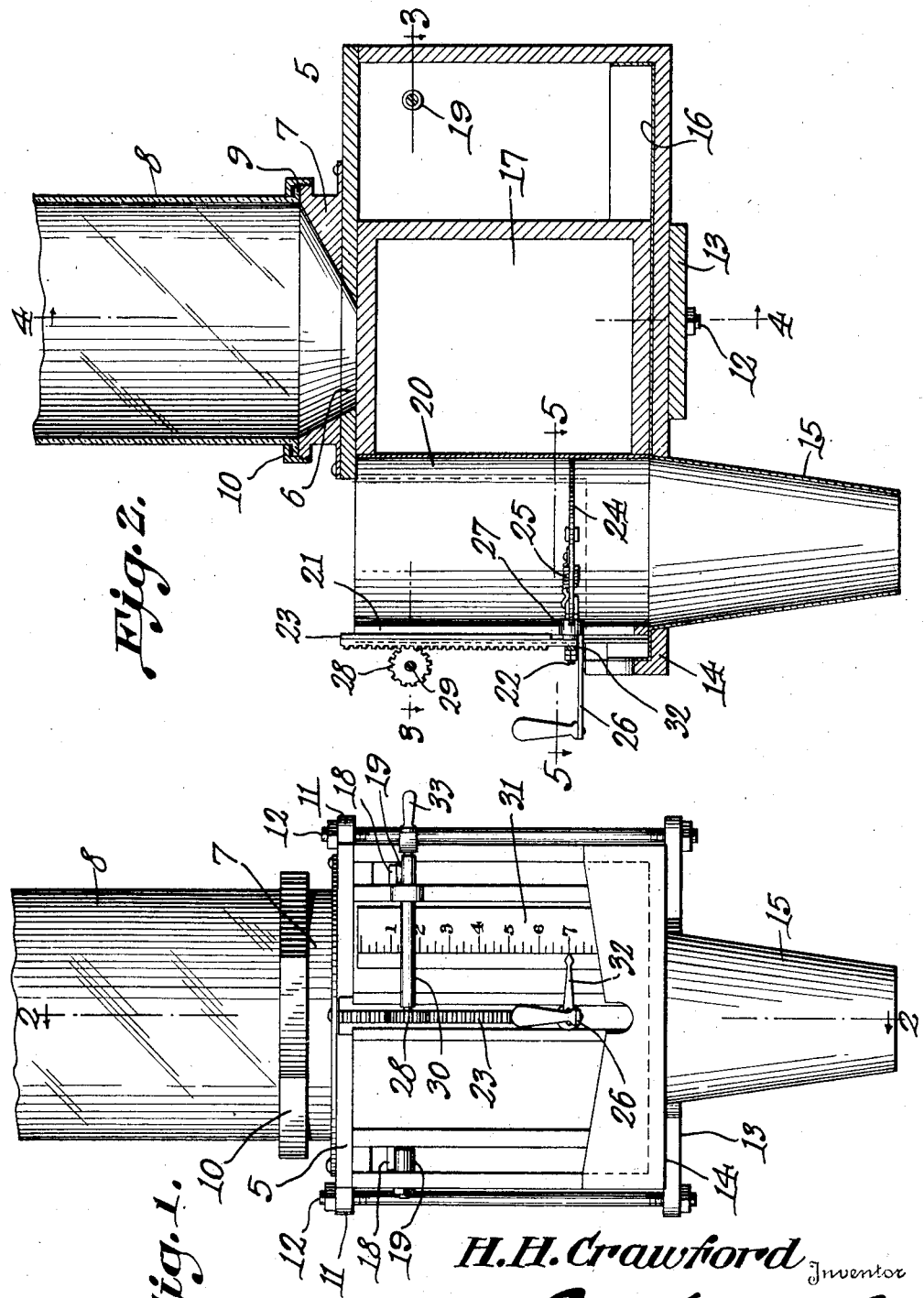
H.H.Crawford, Inventor
By C.A.Snow&Co.
Attorneys.

Nov. 19, 1929.  H. H. CRAWFORD  1,736,490
MEASURING DEVICE
Filed Jan. 31, 1929    2 Sheets-Sheet 2
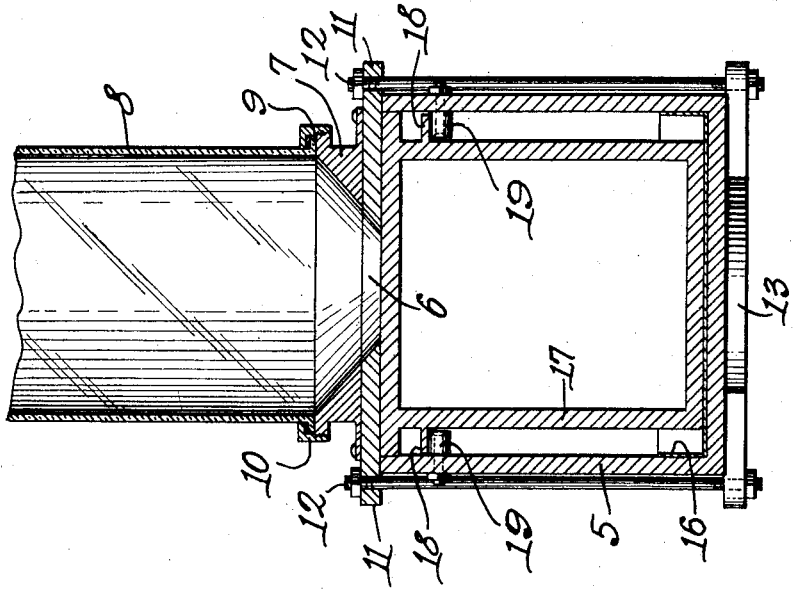
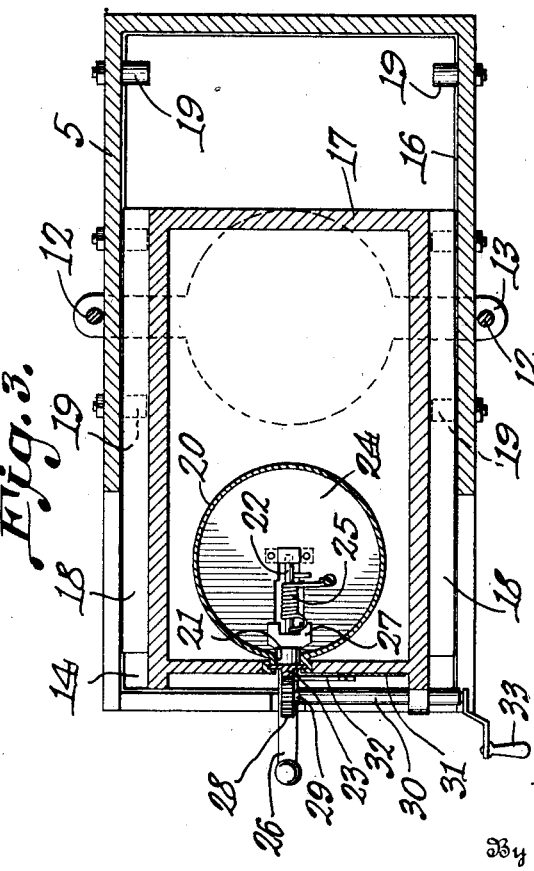
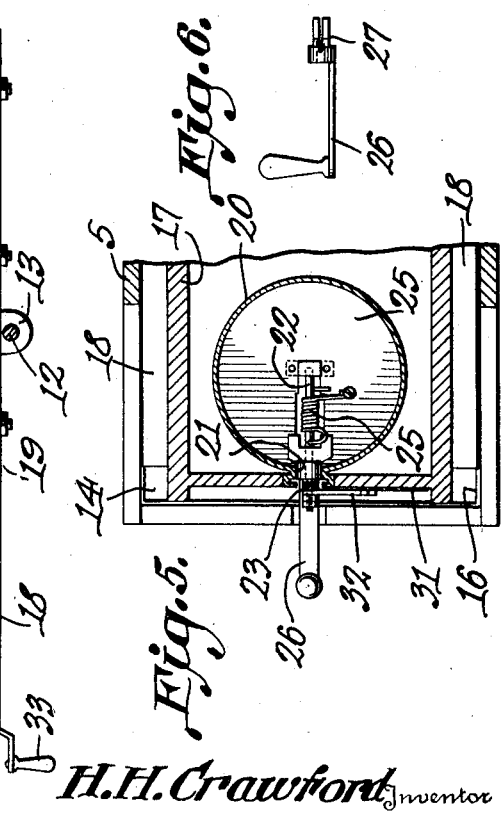

Patented Nov. 19, 1929

1,736,490

UNITED STATES PATENT OFFICE.

HENRY HUNTER CRAWFORD, OF LITTLE ROCK, ARKANSAS

MEASURING DEVICE

Application filed January 31, 1929. Serial No. 336,595.

This invention relates to a measuring device and more particularly to a measuring device especially designed for use in measuring and handling material such as sugar, flour, beans or the like.

The primary object of the invention is to provide a device of this character to facilitate the handling of materials of this kind, the material measured being housed at all times to exclude foreign matter to insure the sanitary handling of the material.

Another object of the invention is to provide a device of this character wherein a slight adjustment may be made to vary the amount of material measured, means being provided for releasing the material which may be directed to a suitable container.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawings:

Figure 1 is a front elevational view of a measuring device constructed in accordance with the invention.

Figure 2 is a sectional view taken on line 2—2 of Figure 1.

Figure 3 is a sectional view taken on line 3—3 of Figure 2.

Figure 4 is a sectional view taken on line 4—4 of Figure 2.

Figure 5 is a sectional view taken on line 5—5 of Figure 2.

Figure 6 is a view illustrating the operating handle of the device.

Referring to the drawings in detail, the body portion of the device is indicated generally by the reference character 5, and as shown is box-like in formation and provided with an opening 6 in the top thereof over which the funnel member 7 is positioned to direct material to the opening.

The container which is indicated by the reference character 8, is formed preferably of glass and as shown is provided with a flange 9 extending laterally from the lower end thereof, there being provided a threaded securing ring 10 cooperating with the flange and funnel member 7 in clamping the container in position on the body portion.

Enlargements 11 extend laterally from the top or upper wall of the body portion and are formed with openings to receive the bolts 12, which bolts also pass through openings formed in the ends of the plate 13 for supporting the weight of the body portion.

As clearly shown by Figure 2 of the drawings the lower wall or bottom of the body portion extends forwardly an appreciable distance beyond the upper wall of the body portion as at 14, where it is provided with an opening to receive the spout 15 forming a part of the metallic lining 16 of the body portion.

The measuring of the material passing through the device, is accomplished by the box-like member 17 which is slidably mounted within the body portion 5. This box-like member 17 is provided with lateral flanges 18 disposed adjacent to the upper edge thereof, which flanges provide tracks for supporting the slidable measuring member 17.

Rollers 19 are supported within the body portion and on which rollers these flanges rest to support the measuring member 17 in such a way that it may be moved readily to accomplish the measuring result.

Secured within the measuring device 17 is a measuring cylinder 20 which is formed with an elongated cut out portion 21 formed in the side thereof through which cut out portion the shaft 22 extends, the shaft being secured within an opening formed at the lower end of the rack bar 23 that operates over the opening 21 and normally closes the opening.

Mounted on the shaft 22, is a vertically adjustable disk 24 which constitutes the movable bottom for the cylindrical measuring member 20, there being provided a coiled spring connected with the shaft 22 and the disk-like bottom 24 for returning the disk-like bottom 24 to its initial position, after it has been operated.

The reference character 26 designates a handle which is provided with a bifurcated extremity 27 fitted over the disk-like bottom 24, so that when the handle is rotated, the disk-like bottom 24 will be moved correspondingly to accomplish the releasing of the material in the cylindrical measuring member 20.

This handle 26 also constitutes means whereby the box-like member 17 may be moved from a receiving position under the container 8, to a discharging position over the spout 15.

Cooperating with the rack bar 23 is a pinion 28 secured at the inner end of the shaft 29 mounted in the bearing 30 which pinion, when rotated will act to raise or lower the rack bar 23 to raise or lower the disk-like bottom 24 reducing or increasing the capacity of the cylindrical measuring member.

In order that the disk-like bottom may be brought to a proper position for an accurate measuring, a graduated member 31 is provided at the front of the device, there being provided an indicator 32 extending from the shaft 22 to move opposite the graduations to the end that a person operating the handle 33 formed at one end of the shaft 29, may move the bottom 24 to a proper position for measuring.

The operation of the device is as follows:

Assuming that four pounds of material are to be measured the handle 26 is moved to raise the disk-like bottom 24 to a position opposite to the number 4 on the member 31. The member 17 is now moved rearwardly within the body portion to bring the cylindrical measuring member 20 opposite to the opening 6 whereupon the material will pass into the cylindrical member 20 by gravity, and fill the member 20.

The member 17 is now moved forwardly to bring the cylindrical measuring member 20 to a position above the spout 15, whereupon the disk-like bottom is rotated to allow the material in the cylindrical measuring member 20 to pass into the spout 15 which directs the material into a sack or other suitable container held over the spout 15.

I claim:

1. A measuring device including a body portion, a movable member in the body portion, a cylindrical measuring member in the movable member and adapted to receive material to be measured, a vertically movable bottom in the measuring member, a rack bar connected with the bottom, a pinion in mesh with the rack bar, means for rotating the pinion to raise and lower the bottom, and means for rotating the bottom to discharge material from the cylindrical measuring member.

2. A measuring device including a body portion, pairs of rollers supported within the body portion, a movable measuring member operating within the body portion, lateral flanges formed on the measuring member and resting on the rollers, to slidably support the measuring member, a cylindrical member within the measuring member, means for varying the capacity of the cylindrical member, and means for releasing material from the cylindrical member.

3. A measuring device including a body portion, a container for delivering material to the body portion, a slidable measuring member within the body portion, a cylindrical member forming a part of the measuring member, a shaft extending into the cylindrical member, a bottom rotatably mounted on the shaft, means for rotating the bottom to discharge material from the cylindrical member, and means for raising and lowering the bottom to vary the capacity of the cylindrical member.

4. A measuring device including a body portion, a container, a movable member operating within the body portion, a cylindrical measuring member supported within the movable member, said cylindrical measuring member having an elongated opening, a shaft extended through the opening, a disk-like bottom on the shaft snugly fitting within said cylindrical measuring member, means for raising and lowering the shaft to vary the capacity of the cylindrical measuring member, and means for rotating the bottom to discharge material from the cylindrical measuring member.

5. A measuring device including a body portion, a movable member within the body portion, a cylindrical measuring member carried by the movable member, said measuring member having an elongated opening formed in the side thereof, a substantially wide rack bar normally closing the opening, a shaft connected with the rack bar, a bottom member supported by the shaft, means for moving the rack bar and bottom member to vary the capacity of the cylindrical measuring member, and means for rotating the bottom member to discharge material from the measuring member.

In testimony that I claim the foregoing as my own, I have hereto affixed my signature.

HENRY HUNTER CRAWFORD.